United States Patent
Yoshida

(10) Patent No.: US 8,581,892 B2
(45) Date of Patent: Nov. 12, 2013

(54) OPTICAL POSITION DETECTING DEVICE AND DISPLAY DEVICE WITH POSITION DETECTING FUNCTION

(75) Inventor: Kazuki Yoshida, Chino (JP)

(73) Assignee: Seiko Epson Corporation (JP)

( * ) Notice: Subject to any disclaimer, the term of this patent is extended or adjusted under 35 U.S.C. 154(b) by 209 days.

(21) Appl. No.: 13/107,168

(22) Filed: May 13, 2011

(65) Prior Publication Data

US 2011/0304600 A1    Dec. 15, 2011

(30) Foreign Application Priority Data

Jun. 11, 2010  (JP) ................. 2010-133677

(51) Int. Cl.
*G09G 5/00*    (2006.01)

(52) U.S. Cl.
USPC .......................................................... 345/207

(58) Field of Classification Search
USPC .............................................. 345/207, 175
See application file for complete search history.

(56) References Cited

U.S. PATENT DOCUMENTS

| | | | |
|---|---|---|---|
| 4,794,634 A * | 12/1988 | Torihata et al. ............ | 379/93.19 |
| 5,887,089 A | 3/1999 | Deacon et al. | |
| 5,912,997 A | 6/1999 | Bischel et al. | |
| 5,978,524 A | 11/1999 | Bischel et al. | |
| 6,078,704 A | 6/2000 | Bischel et al. | |
| 6,118,908 A | 9/2000 | Bischel et al. | |
| 6,167,169 A | 12/2000 | Brinkman et al. | |
| 6,393,172 B1 | 5/2002 | Brinkman et al. | |
| RE37,809 E | 7/2002 | Deacon et al. | |
| 6,522,794 B1 | 2/2003 | Bischel et al. | |
| 7,435,940 B2 | 10/2008 | Eliasson et al. | |
| 7,843,571 B2 | 11/2010 | Naya et al. | |
| 8,363,035 B2 * | 1/2013 | Nakanishi ................. | 345/175 |
| 2010/0182294 A1 * | 7/2010 | Roshan et al. ............. | 345/207 |
| 2010/0327766 A1 | 12/2010 | Recker et al. | |
| 2011/0037732 A1 | 2/2011 | Takama et al. | |
| 2011/0121654 A1 | 5/2011 | Recker et al. | |
| 2011/0122108 A1 * | 5/2011 | Kozuma et al. ........... | 345/207 |
| 2011/0133655 A1 | 6/2011 | Recker et al. | |
| 2011/0164010 A1 * | 7/2011 | Yamamoto et al. ....... | 345/207 |
| 2012/0019494 A1 * | 1/2012 | Lum et al. ................. | 345/207 |
| 2012/0212375 A1 | 8/2012 | Depree, IV | |

FOREIGN PATENT DOCUMENTS

JP    2005-173684    6/2005

* cited by examiner

*Primary Examiner* — Fred Tzeng

(74) *Attorney, Agent, or Firm* — Harness, Dickey & Pierce, P.L.C.

(57) ABSTRACT

An optical position detecting device includes: a plurality of detection light source sections which emits a detection light; a light source driving section which turns on a part of the plurality of detection light source sections in a first period, and turns on the other part thereof in a second period; a first light detecting section which detects the detection light reflected by a object; a second light detecting section which has a sensitivity peak in a wavelength band which is different from that of the first light detecting section and detects the detection light reflected by the object; and a position detecting section which detects the position of the object on the basis of the intensity of the detection light in the first light detecting section and the intensity of the detection light in the second light detecting section in the first and second periods.

8 Claims, 14 Drawing Sheets

(12A,12D=TURNED ON
12B,12C=TURNED OFF)

(12A,12D=TURNED OFF
12B,12C=TURNED ON)

(12A,12C=TURNED ON
12B,12D=TURNED OFF)

(12A,12C=TURNED OFF
12B,12D=TURNED ON)

(12A,12D=TURNED ON
 12B,12C=TURNED OFF)

(12A,12D=TURNED OFF
 12B,12C=TURNED ON)

(12A,12C=TURNED ON
 12B,12D=TURNED OFF)

(12A,12C=TURNED OFF
 12B,12D=TURNED ON)

OPTICAL POSITION DETECTING DEVICE AND DISPLAY DEVICE WITH POSITION DETECTING FUNCTION

BACKGROUND

1. Technical Field

The present invention relates an optical position detecting device which optically detects the position of a target object, and a display device with a position detecting function having the same.

2. Related Art

As an optical position detecting device which optically detects the position of a target object, a technique has been proposed which detects a position when light emitted from a light projection means is blocked by an indicating device and detects the light emitted from the indicating device to thereby detect the position of the indicating device (refer to JP-A-2005-173684).

However, in the case of the technique of using the light emitted from the indicating device, since input through a finger, hand or the like is not possible, its usage is limited.

Accordingly, as schematically shown in FIG. 14, the inventor has studied an optical position detecting device in which a detection light source 12 is disposed to face an end portion of a light guiding plate 13, and a reflected light obtained as a detection light L2 exiting from the light guiding plate 13 and contacting a target object Ob of a finger is detected by a light detector 30. In such an optical position detecting device, the detection light L2 exiting from the light guiding plate 13 forms a light intensity distribution in which a light intensity monotonically decreases toward a side away from the side where the detection light source 12 is disposed, in an exiting space of the detection light L2. Accordingly, it is possible to detect the position of the target object Ob on the basis of the detection intensity in the light detector 30. According to such a technique, the target object Ob may be a finger or the like, and need not necessarily to be a light emitting indicating device.

However, in the method shown in FIG. 14, in a case where there exist portions having different reflection rates on the surface of the target object Ob, for example, in a case where there is a partial color difference or gloss difference on the target object Ob, even though the target object Ob is disposed in the same position, the detection intensity in the light detector 30 is changed, thereby deteriorating the detection accuracy.

SUMMARY

An advantage of some aspects of the invention is that it provides an optical position detecting device which is capable of detecting the position of a target object with high accuracy, even though there exist portions having different reflection rates in the target object Ob when receiving light reflected by the target object to detect the position of the target object, and a display device with a position detecting function having the optical position detecting device.

According to an aspect of the invention, there is provided an optical position detecting device which optically detects the position of a target object, including: a plurality of detection light sources which emits a detection light; a light source driving section which sequentially turns on the plurality of detection light sources; a first light detector which detects the detection light reflected by the target object which is disposed in a detection light exiting space to which the detection light exits; a second light detector which has a sensitivity peak in a wavelength band which is different from that of the first light detector and detects the detection light reflected by the target object which is disposed in the detection light exiting space; and a position detecting section which detects the position of the target object in the detection light exiting space on the basis of the detection intensity of the detection light in the first light detector and the detection intensity of the detection light in the second light detector when the plurality of detection light sources are sequentially turned on.

In this aspect, the position detecting section may detect the position of the target object in the detection light exiting space on the basis of the difference between the detection intensity of the detection light in the first light detector and the detection intensity of the detection light in the second light detector.

According to this aspect, the plurality of detection light sources is sequentially turned on to emit the detection lights, part of the detection light reflected by the target object which is disposed in the detection light exiting space is received by the light detectors (first light detector and second light detector), and the position of the target object is detected on the basis of the detection intensities (detection intensity in the first light detector and detection intensity in the second light detector) in the light detectors. Thus, the target object may be fingers or the like, and need not be a light emitting indicating device. In such an optical position detecting device, in a case where the target object is a finger coated with nail polish for example, the reflection intensity becomes high in the coated portion compared with other portions, and thus, positions other than the position of the target object influence the detection intensity in the light detector. Thus, according to this aspect, the first light detector and the second light detector which have sensitivity peaks in different wavelength bands are used as the light detectors. Thus, if the sensitivity peak in the second light detector is in a band corresponding to the wavelength band reflected by the nail polish, by calculating the difference between the detection intensity of the detection light in the first light detector and the detection intensity of the detection light in the second light detector, it is possible to compensate for the amount of the light intensity reflected by the nail polish from the detection intensity in the light detector. Thus, it is possible to detect the position of the target object with high accuracy.

In this aspect, the optical position detecting device may include a light guiding plate which is formed with a light incident section to which the detection lights emitted from the plurality of detection light sources are incident and a light exiting section from which the detection lights incident from the light incident section exit. A first light intensity distribution for a first coordinate detection in which the light intensity monotonically decreases from one side of a first direction which intersects with a light exiting direction of the detection light from the light guiding plate toward the other side thereof, and a second light intensity distribution for a first coordinate detection in which the light intensity monotonically decreases from the other side of the first direction to the one side thereof, may be sequentially formed in the detection light exiting space, when the plurality of detection light sources is sequentially turned on. With such a configuration, it is possible to detect the position of the target object on the basis of the difference or ratio between the detection intensities (detection intensity in the first light detector and detection intensity in the second light detector) in the light detectors when the first light intensity distribution for the first coordinate detection and the second light intensity distribution for the first coordinate detection are formed. Thus, it is possible to detect the position of the target object without the influence of environmental light or the like, compared with a case where the position of the target object is detected only from one light intensity distribution.

In this case, it is preferable that a first light intensity distribution for a second coordinate detection in which the light intensity monotonically decreases from one side of a second direction which intersects with the light exiting direction of the detection light from the light guiding plate and the first direction toward the other side thereof, and a second light intensity distribution for a second coordinate detection in which the light intensity monotonically decreases from the other side of the second direction to the one side thereof, are sequentially formed in the detection light exiting space, when the plurality of detection light sources is sequentially turned on. With such a configuration, it is possible to detect the coordinates (two dimensional coordinates) of the target object in the first and second directions which intersect with the exiting direction of the detection light from the light guiding plate.

In this aspect, the light source driving section may differentiate the plurality of detection light sources so that the light receiving intensities in the light detectors are equal to each other by changing the combination of a part of the plurality of detection light sources and the other part thereof.

In this aspect, the optical position detecting device may further include a reference light source which makes a reference light incident to the light detector without being reflected to the detection light exiting space. The light source driving section may differentiate the reference light source and a part of the plurality of detection light sources so that the light receiving intensities in the light detectors are equal to each other by changing the combination of the reference light source and the part of the plurality of detection light sources.

In this aspect, it is preferable that the detection light is infrared light. With such a configuration, the detection light is not visible.

The optical position detecting device according to the invention may be used in a display device with a position detecting function. The display device with such a position detecting function includes an image generating device which forms an image in a region overlapping with the detection light exiting space.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, embodiments of the invention will be described in detail with reference to the accompanying drawings. In the following description, it is assumed that intersecting axes are the X, Y, and Z axes. In the figures, the X axial direction (first direction) represents a transverse direction, the Y axial direction (second direction) represents a longitudinal direction, and the Z axial direction (third direction) represents a direction in which a detection light proceeds in a detection light exiting space, for ease of description. Further, in the figures, one side of the X axial direction is the side of X1, the other side thereof is the side of X2, one side of the Y axial direction is the side of Y1, and the other side thereof is the side of Y2. Further, in the figures, reduction scales are differently applied to each part so that each part can have a size recognizable in the figure.

First Embodiment

Overall Configuration of Optical Position Detecting Device

Figure 1A:
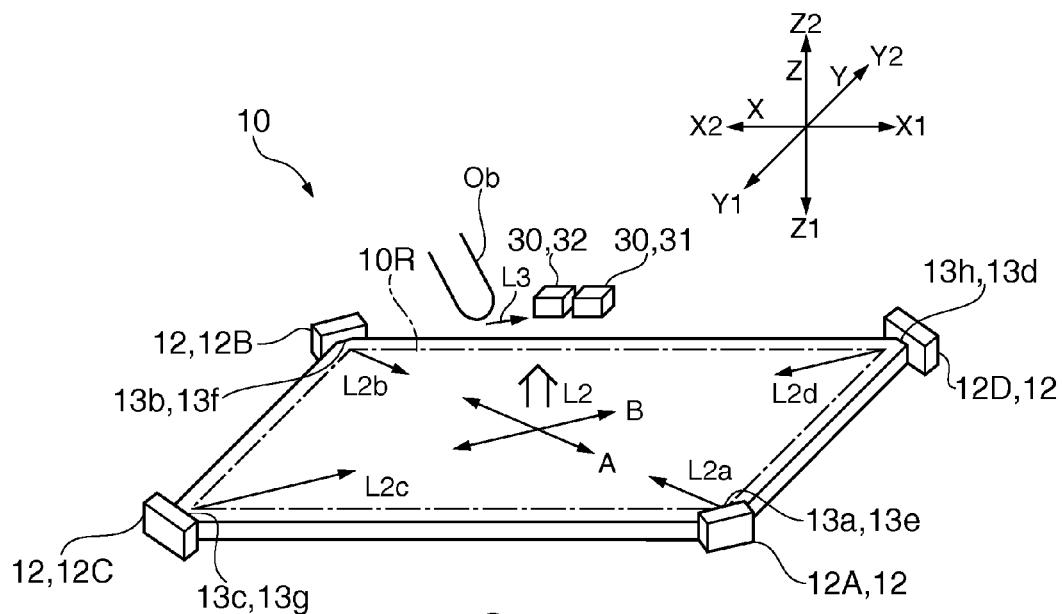
FIGS. 1A and 1B are diagrams illustrating main parts of an optical position detecting device according to a first embodiment of the invention.
Figure 1B:
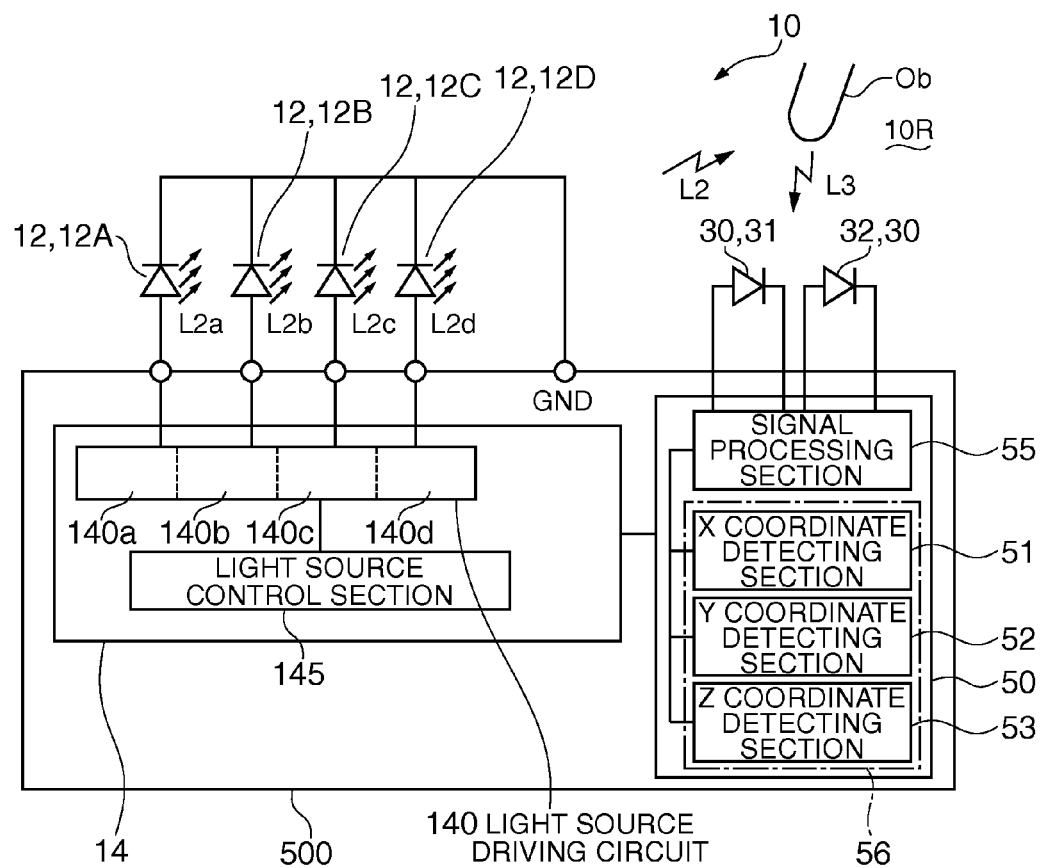
Figure 2A:
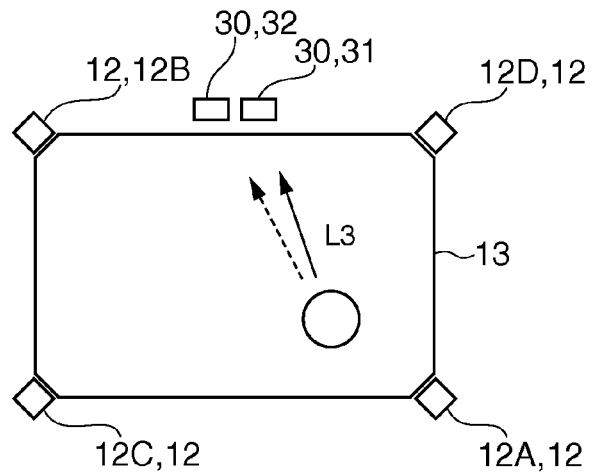
FIGS. 2A to 2C are diagrams illustrating detection lights used in the optical position detecting device according to the first embodiment of the invention.
Figure 2B:
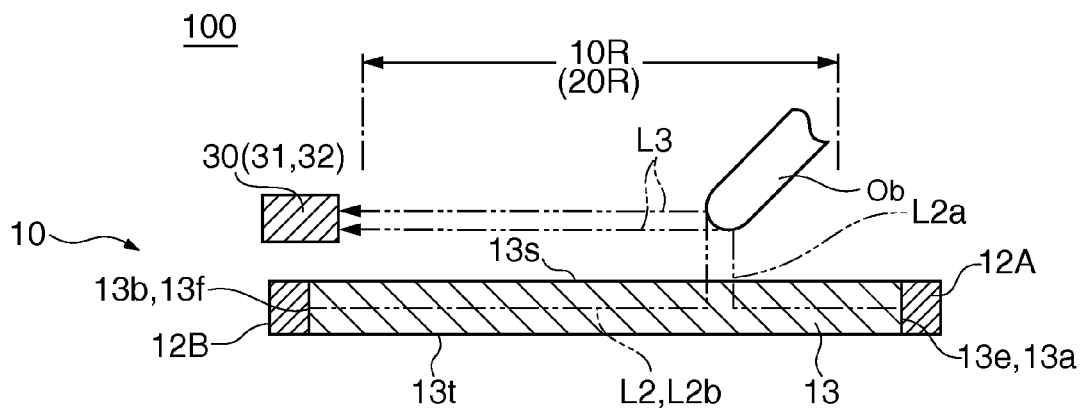
Figure 2C:
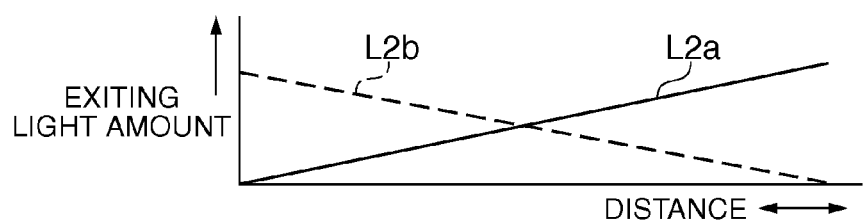

FIGS. 1A and 1B are diagrams illustrating main parts of an optical position detecting device according to a first embodiment of the invention, in which FIG. 1A is a diagram illustrating a layout of optical components used in the optical position detecting device, and FIG. 1B is a diagram illustrating an electric configuration of the optical position detecting device. FIGS. 2A, 2B and 2C are diagrams illustrating detection lights used in the optical position detecting device according to the first embodiment of the invention, in which FIG. 2A is a plan diagram illustrating a state where light reflected by a target object is received in a light detector, FIG. 2B is a cross-sectional diagram illustrating a state where light reflected by the target object is received in the light detector, and FIG. 2C is a diagram illustrating an attenuation state of a detection light in a light guiding plate.

As shown in FIG. 1A and FIGS. 2A and 2B, the optical position detecting device 10 in this embodiment includes a plurality of detection light sources 12 (detection light sources 12A to 12D) which emits detection lights L2, and a light detector 30 which detects part of a detection light L3 which is reflected from a target object Ob in a detection space 10R (exiting space of the detection light L2), in the detection light L2 emitted from the detection light sources 12.

In the optical position detection device 10 according to this embodiment, four detection light sources 12A to 12D are used as the plurality of detection light sources 12. All of the plurality of detection light sources 12 are formed by an LED (light emitting diode) or the like, and emit the detection lights L2 of infrared light as diverging light. That is, since it is preferable that the detection light L2 has a wavelength region which is efficiently reflected by the target object Ob such as a finger, the detection light L2 has a peak in an infrared region having a high reflection rate on a surface of a human body. For example, the detection light L2 is a light having a peak in the vicinity of near infrared rays, for example, having a wavelength of 850 nm, which is close to the visible light region.

Further, the optical position detection device 10 in this embodiment includes a light guiding plate 13 such as a transparent resin plate made of polycarbonate, acrylic resin or the like, and the detection light L2 emitted from the detection light source 12 exits to the detection space 10R through the light guiding plate 13. The light guiding plate 13 has an approximately rectangular planar shape. In the light guiding plate 13, a surface facing the detection space 10R is a light exiting surface 13s. Further, four corner portions 13a to 13d of the light guiding plate 13 are used as light incident portions 13e to 13h of the detection lights L2 emitted from the detection light sources 12. More specifically, four detection light sources 12 (detection light sources 12A to 12D) have light emitting surfaces facing the corner portions 13a to 13d in positions facing the corner portions 13a to 13d of the light guiding plate 13. Thus, the detection lights L2 emitted from the detection light sources 12 are incident through the corner portions 13a to 13d of the light guiding plate 13, and then exit from the light exiting surface 13s while propagating inside the light guiding plate 13. For example, a detection light L2a emitted from the detection light source 12A exits from the light exiting surface 13s while propagating inside the light guiding plate 13. Accordingly, if the detection light L2 exiting from the light exiting surface 13s of the light guiding plate 13 into the detection space 10R is reflected by the target object Ob disposed in the detection space 10R, the detection light L3 which is reflected by the target object Ob is detected by the light detector 30.

Here, on a rear surface 13t of the light guiding plate 13 or the light exiting surface 13s, a surface concave-convex structure, a prism structure, a scattering layer (not shown), or the like is provided. According to such a light scattering structure, the lights which are incident from the corner portions 13a to 13d and propagate inside the light guiding plates are gradually deflected as the lights advance along the propagation direction thereof, and exit from the light exiting surface 13s. Further, in order to obtain the uniformity of detection lights L2a to L2d as necessary, an optical sheet such as a prism sheet or a light scattering plate may be disposed on the light emission side of the light guiding plate 13. Thus, the light amount of the detection light L2a exiting to the detection space 10R is linearly attenuated according to the distance from the detection light source 12A, as indicated by a solid line in FIG. 2C. Further, the light amount of the detection light L2b exiting to the detection space 10R is linearly attenuated according to the distance from the detection light source 12B, as indicated by a dashed line in FIG. 2C. Similarly, the detection lights L2c and L2d exiting from the other detection light sources 12C and 12D exit from the light exiting surface 13s while being attenuated. Accordingly, the detection light L2 forms a light intensity distribution which will be described later with reference to FIGS. 3A to 3D and FIGS. 5A to 5D in the detection space 10R.

Configuration of Light Detector 30

The light detector 30 includes a light receiving section which has a light receiving element made of a photodiode, a phototransistor or the like and faces the detection space 10R in an approximately central position of a side portion of the light guiding plate 13 from the outside of the detection space 10R. In this embodiment, the light detector 30 is made of the photodiode.

In the optical position detecting device 10 according to this embodiment, a plurality of light detectors having sensitivity peaks in different wavelength bands is used as the light detector 30, and the plurality of light detectors is disposed in adjacent positions. In this embodiment, two light detectors (a first light detector 31 and a second light detector 32) are used as the plurality of light detectors 30. The first light detector 31 has a sensitivity peak in a position which approximately overlaps with a central peak of the detection light L2, or a wavelength band close to the central peak of the detection light L2, for example, in a wavelength band of 800 nm to 1000 nm. In this embodiment, the sensitivity peak of the light detector 30 is 1000 nm. On the other hand, the second light detector 32 has a sensitivity peak which is in the visible band, for example, a sensitivity peak of 500 nm.

Electric Configuration of Optical Position Detecting Device 10

As shown in FIG. 1B, the optical position detecting device 10 includes a light source driving section 14 which drives the detection light sources 12 (detection light sources 12A to 12D) and a position detecting section 50 in which a detection result is output from the light detector 30. The light source driving section 14 and the position detecting section 50 are configured by a common semiconductor integrated circuit 500, for example. The light source driving section 14 includes a light source driving circuit 140 (light source driving circuits 140a to 140d) which drive the detection light sources 12 (detection light sources 12A to 12D) and a light source control section 145 which controls the detection light sources 12 (detection light sources 12A to 12D) through the light source driving circuit 140.

The position detecting section 50 includes a signal processing section 55 and a coordinate detecting section 56, and the coordinate detecting section 56 detects a position of the target object Ob on the basis of the detection result in the light detector 30. In this embodiment, the coordinate detecting section 56 includes an X coordinate detecting section 51, a Y coordinate detecting section 52, and a Z coordinate detecting section 53. The light source control section 145 and the position detecting section 50 are connected with each other by a signal line. Driving for the detection light source 12 and a detection operation in the position detecting section 50 are performed in association with each other.

Light Intensity Distribution

FIGS. 3A to 3D are diagrams illustrating detection lights emitted from the detection light sources 12 (detection light sources 12A to 12D) in the optical position detecting device 10 according to the first embodiment of the invention. FIGS. 4A to 4D are diagrams illustrating a state where a light intensity distribution is formed by sequentially turning on the detection light sources 12 (detection light sources 12A to 12D) in a predetermined pattern in the optical position detecting device 10 according to the first embodiment of the invention. FIGS. 5A to 5D are diagrams illustrating a state where a light intensity distribution for coordinate detection is formed by the detection light L2 emitted from the detection light sources 12, in the optical position detecting device 10 according to the first embodiment of the invention. In FIGS. 4A to 4D, the turned on detection light sources 12 are indicated by the color gray.

Figure 3A:
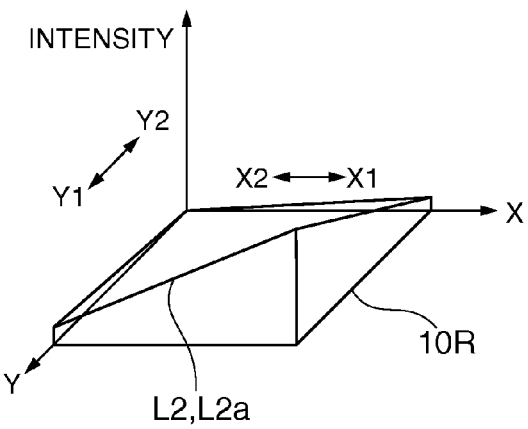
FIGS. 3A to 3D are diagrams illustrating detection lights emitted from detection light sources in the optical position detecting device according to the first embodiment of the invention.
Figure 3B:
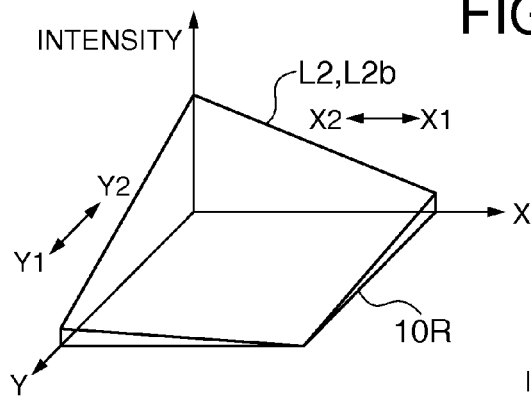
Figure 3C:
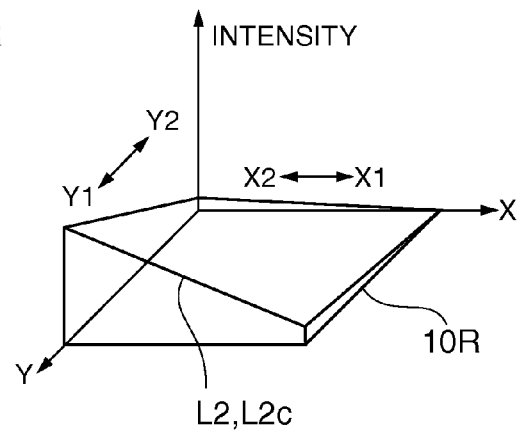
Figure 3D:
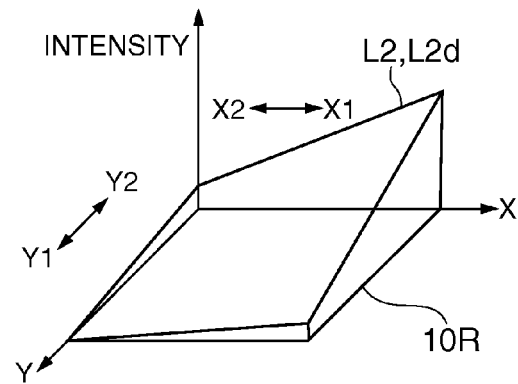

In the optical position detecting device 10 according to this embodiment, if the detection light source 12A is turned on and the other detection light sources 12B to 12D are in a turned off state, as shown in FIG. 3A, a light intensity distribution is formed centering around corner portions of one side X1 in the X axial direction and one side Y1 in the Y axial direction, in the detection space 10R. If the detection light source 12B is turned on and the other detection light sources 12A, 12C and 12D are in a turned off state, as shown in FIG. 3B, a light intensity distribution is formed centering around corner portions of the other side X2 in the X axial direction and the other side Y2 in the Y axial direction, in the detection space 10R. If the detection light source 12C is turned on and the other detection light sources 12A, 12B and 12D are in a turned off state, as shown in FIG. 3C, a light intensity distribution is formed centering around corner portions of the other side X2 in the X axial direction and one side Y1 in the Y axial direction, in the detection space 10R. If the detection light source 12D is turned on and the other detection light sources 12A to 12C are in a turned off state, as shown in FIG. 3D, a light intensity distribution is formed centering around corner portions of one side X1 in the X axial direction and the other side Y2 in the Y axial direction, in the detection space 10R.

Figure 4A:
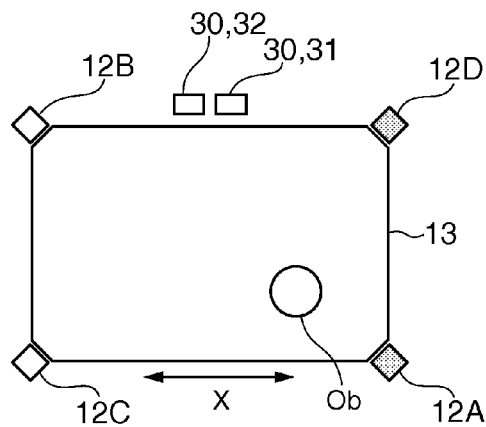
FIGS. 4A to 4D are diagrams illustrating a state where a light intensity distribution is formed by sequentially turning on detection light sources in a predetermined pattern in the optical position detecting device according to the first embodiment of the invention.
Figure 5A:
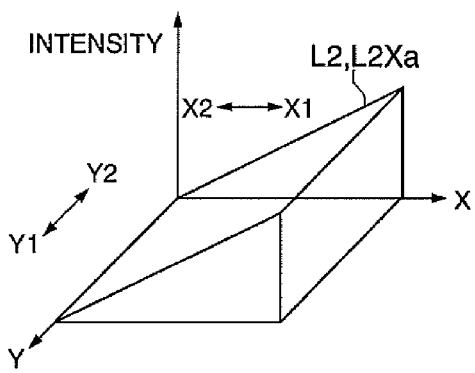
FIGS. 5A to 5D are diagrams illustrating a state where a light intensity distribution for coordinate detection is formed by detection lights emitted from detection light sources, in the optical position detecting device according to the first embodiment of the invention.

Accordingly, as shown in FIG. 4A, if the detection light sources 12A and 12D are in a turned on state and the other detection light sources 12A and 12B are in a turned off state, as shown in FIG. 5A, a first light intensity distribution L2Xa for X coordinate detection (first light intensity distribution for first coordinate detection) is formed in which the intensity of the detection light monotonically decreases from one side X1 in the X axial direction toward the other side X2. In this embodiment, in the first light intensity distribution L2Xa for X coordinate detection, the intensity of the detection light L2 linearly decreases from one side X1 in the X axial direction toward the other side X2, and the intensity of the detection light L2 is constant in the Y axial direction.

Figure 4B:
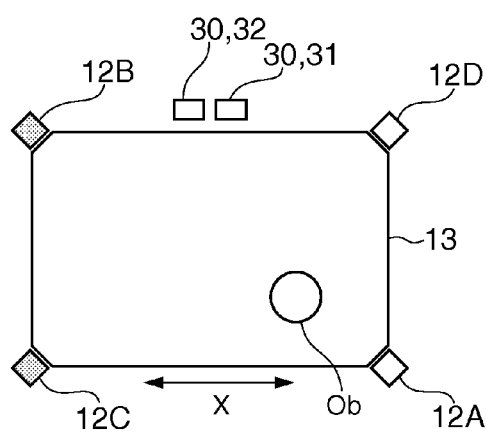
Figure 5C:
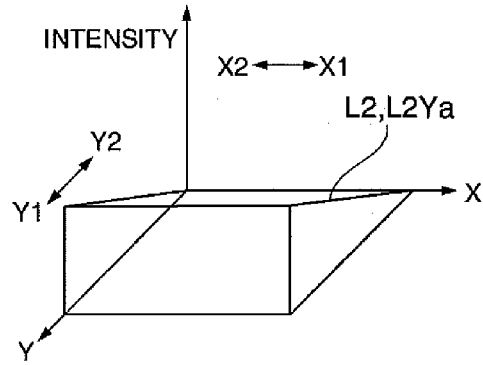
Figure 5B:
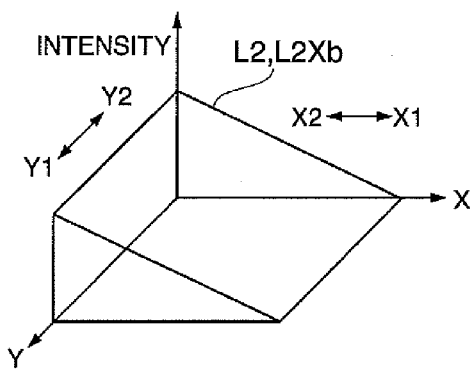

On the other hand, as shown in FIG. 4B, if the detection light sources 12B and 12C are in a turned on state, and the other detection light sources 12A and 12D are in a turned off state, as shown in FIG. 5B, a second light intensity distribution L2Xb for X coordinate detection (second light intensity distribution for a first coordinate detection) is formed in which the intensity of the detection light monotonically decreases from the other side X2 in the X axial direction toward one side X1. In this embodiment, in the second light intensity distribution L2Xb for X coordinate detection, the intensity of the detection light L2 linearly decreases from the other side X2 in the X axial direction toward one side X1, and the intensity of the detection light L2 is constant in the Y axial direction.

Figure 4C:
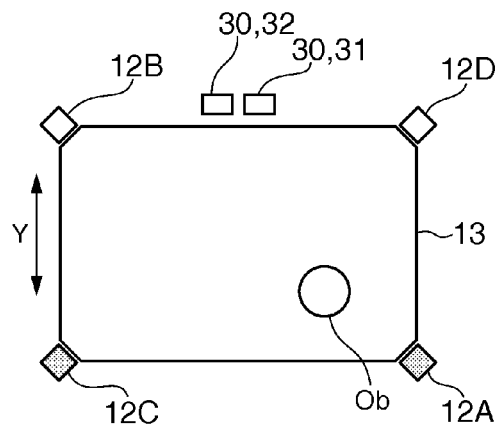

Further, as shown in FIG. 4C, if the detection light sources 12A and 12C are in a turned on state, and the other detection light sources 12B and 12D are in a turned off state, as shown in FIG. 5C, a first light intensity distribution L2Ya for Y coordinate detection (first light intensity distribution for second coordinate detection) is formed in which the intensity of the detection light monotonically decreases from one side Y1 in the Y axial direction toward the other side Y2. In this embodiment, in the first light intensity distribution L2Ya for Y coordinate detection, the intensity of the detection light L2 linearly decreases from one side Y1 in the Y axial direction toward the other side Y2, and the intensity of the detection light L2 is constant in the X axial direction.

Figure 4D:
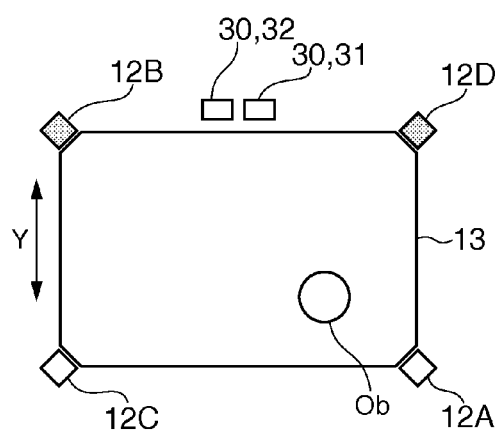
Figure 5D:
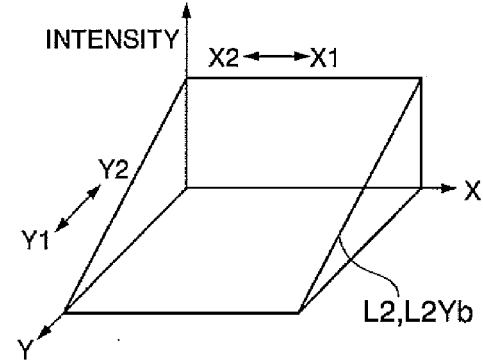

On the other hand, as shown in FIG. 4D, if the detection light sources 12B and 12D are in a turned on state, and the other detection light sources 12A and 12C are in a turned off state, as shown in FIG. 5D, a second light intensity distribution L2Yb for Y coordinate detection (second light intensity distribution for second coordinate detection) is formed in which the intensity of the detection light monotonically decreases from the other side Y2 in the Y axial direction toward one side Y1. In this embodiment, in the second light intensity distribution L2Yb for Y coordinate detection, the intensity of the detection light L2 linearly decreases from the other side Y2 in the Y axial direction toward one side Y1, and the intensity of the detection light L2 is constant in the X axial direction.

Although not shown, if four detection light sources 12 (detection light sources 12A to 12D) are all turned on, a light intensity distribution for Z coordinate detection is formed in which the intensity decreases from one side Z1 in the Z axial direction toward the other side Z2, from the light guiding plate 13. In such a light intensity distribution for Z coordinate detection, the intensity monotonically decreases in the Z axial direction. This change can be considered as an approximately linear change in the limited space of the detection space 10R. Further, in the light intensity distribution for Z coordinate detection, the intensity is constant in the X axial direction and the Y axial direction.

Basic Principle of X Coordinate Detection

In the optical position detecting device 10 according to this embodiment, the detection light source 12 for light intensity distribution formation is turned on to form the light intensity distribution of the detection light L2 in the detection space 10R, and the detection light L2 which is reflected by the target object Ob is detected using the light detector 30. The position detecting section 50 detects the position of the target object Ob in the detection space 10R, on the basis of the detection result in the light detector 30. Next, the coordinate detection principle will be described with reference to FIGS. 6A and 6B. When position information about the target object Ob in the detection space 10R is obtained on the basis of the detection result in the light detector 30, for example, a configuration may be employed in which a microprocessor unit (MPU) is used as the light source control section 145 or the position detecting section 50 to allow predetermined software (operation program) to be executed, thereby performing the processes. Further, a configuration may be employed in which hardware such as a logic circuit is used.

Figure 6A:
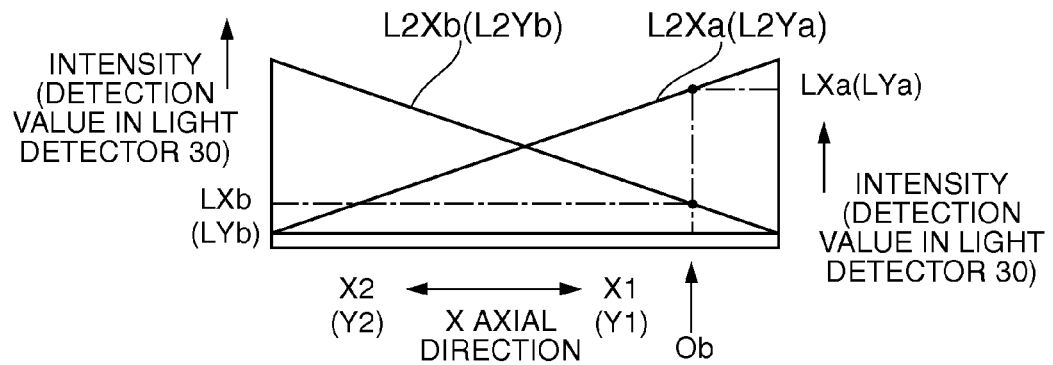
FIGS. 6A and 6B are diagrams schematically illustrating the principle of the optical position detecting device according to the first embodiment of the invention.
Figure 6B:
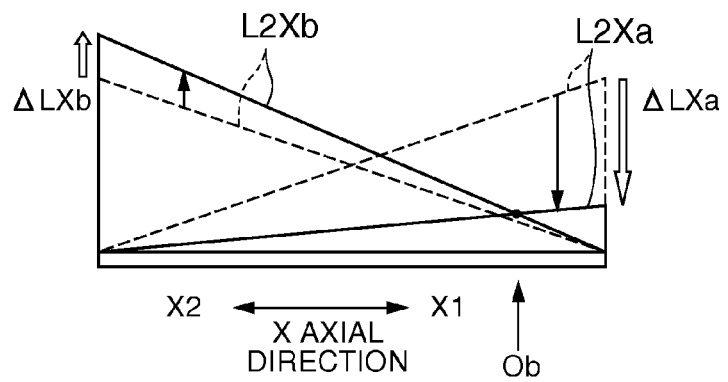

FIGS. 6A and 6B are diagrams schematically illustrating the principle of the optical position detecting device 10 according to the first embodiment of the invention, in which FIG. 6A is a diagram illustrating the intensities of the detection lights reflected from the target object, and FIG. 6B is a diagram illustrating a state where the light intensity distributions of the detection lights are adjusted so that the intensities of the detection lights reflected by the target object becomes equivalent.

In the optical position detecting device 10 according to this embodiment, the position (X coordinate) in the X axial direction is detected using the first light intensity distribution L2xa for X coordinate detection and the second light intensity distribution L2Xb for X coordinate detection, described with reference to FIGS. 5A and 5B. At this time, the detection light sources 12A and 12D and the detection light sources 12B and 12C are driven with reversed phases. More specifically, in a first period for X coordinate detection, the detection light sources 12A and 12D are turned on and the detection light sources 12B and 12C are turned off, to thereby form the first light intensity distribution L2Xa for X coordinate detection shown in FIG. 5A. Then, the detection light sources 12A and 12D are turned off and the detection light sources 12B and 12C are turned on, to thereby form the second light intensity distribution L2Xb for X coordinate detection shown in FIG. 5B. Accordingly, if the target object Ob is disposed in the detection space 10R, the detection light L2 is reflected by the target object Ob, and part of the reflected light is detected by the light detector 30. Here, the first light intensity distribution L2Xa for X coordinate detection and the second light intensity distribution L2Xb for X coordinate detection have a constant distribution. Thus, if the X coordinate detecting section 51 compares the detection intensity in the light detector 30 in the first period for X coordinate detection with the detection intensity in the light detector 30 in a second period for X coordinate detection, it is possible to detect the X coordinate of the target object Ob, using a method which will be described with reference to FIGS. 6A and 6B, for example.

For example, in a first method, the difference or ratio between the first light intensity distribution L2Xa for X coordinate detection and the second light intensity distribution L2Xb for X coordinate detection in FIG. 6A, is used. More specifically, since the first light intensity distribution L2Xa for X coordinate detection and the second light intensity distribution L2Xb for X coordinate detection are predetermined distributions, the difference or ratio between the first light intensity distribution L2Xa for X coordinate detection and the second light intensity distribution L2Xb for X coordinate detection also depend on a predetermined function. Accordingly, if the difference or ratio between a detection value LXa in the light detector 30 when the first light intensity distribution L2Xa for X coordinate detection is formed in the first period for X coordinate detection and a detection value LXb in the light detector 30 when the second light intensity distribution L2Xb for X coordinate detection is formed in the second period for X coordinate detection is calculated, it is possible to detect the X coordinate of the target object Ob. According to such a method, even in a case where environmental light other than the detection light L2, for example, an infrared component included in outside light is incident to the light detector 30, the intensity of the infrared component included in the environmental light is offset when the difference between the detection values LXa and LXb is calculated, and therefore the infrared component included in the environmental light does not influence the detection accuracy.

Next, in a second method, the X coordinate of the target object Ob is detected on the basis of the adjustment amount when the control amount (driving electric current) for the detection light sources 12 is adjusted so that the detection value LXa in the light detector 30 when the first light intensity distribution L2Xa for X coordinate detection is formed in the first period for X coordinate detection becomes equal to the detection value LXb in the light detector 30 when the second light intensity distribution L2Xb for X coordinate detection is formed in the second period for X coordinate detection. Such a method can be applied to a case where the first light intensity distribution L2Xa for X coordinate detection and the second light intensity distribution L2Xb for X coordinate detection are linearly changed with respect to the X coordinate.

Firstly, as shown in FIG. 6A, in the first period for X coordinate detection and in the second period for X coordinate detection, the first light intensity distribution L2Xa for X coordinate detection and the second light intensity distribution L2Xb for X coordinate detection are formed to have the same absolute value and to be reversed in the X axial direction. In this state, if the detection value LXa in the light detector 30 in the first period for X coordinate detection is equal to the detection value LXb in the light detector 30 in the second period for X coordinate detection, it can be understood that the target object Ob is disposed in the center in the X axial direction.

On the other hand, in a case where the detection value LXa in the light detector 30 in the first period for X coordinate detection is different from the detection value LXb in the light detector 30 in the second period for X coordinate detection, the control amount (driving electric current) for the detection light sources 12 is adjusted so that the detection values LXa and LXb become equal to each other, to thereby form the first light intensity distribution L2Xa for X coordinate detection in the first period for X coordinate detection, and to form the second light intensity distribution L2Xb for X coordinate detection in the second period for X coordinate detection, as shown in FIG. 6B, again. Thus, the detection value LXa in the light detector 30 in the first period for X coordinate detection is equal to the detection value LXb in the light detector 30 in the second period for X coordinate detection. It is possible to detect the X coordinate of the target object Ob, using the ratio, difference or the like between the control amount (electric current value) for the detection light sources 12A and 12D and the control amount (electric current value) for the detection light sources 12B and 12C when such a differential is performed. Further, it is possible to detect the X coordinate of the target object Ob, using the ratio, difference or the like between an adjustment amount ΔLXa of the control amount for the detection light sources 12 in the first period for X coordinate detection and an adjustment amount ΔLXb of the control amount for the detection light sources 12 in the second period for X coordinate detection. According to such a method, even in a case where environmental light other than the detection light L2, for example, an infrared component included in outside light is incident to the light detector 30, the intensity of the infrared component included in the environmental light is offset when adjustment of the control amount for the detection light sources 12 is performed so that the detection values LXa and LXb become equal to each other, and therefore the infrared component included in the environmental light does not influence the detection accuracy.

In this way, when the X coordinate is detected, the optical position detecting device 10 is provided with the first light detector 31 and the second light detector 32 which have sensitivity peaks in different wavelength bands, as the light detector 30. In this embodiment, as described later with reference to FIGS. 7A to 7D, the difference between the detection intensity in the first light detector 31 and the detection intensity in the second light detector 32 is used as the detection values LXa and LXb.

Basic Principle of Y Coordinate Detection

In the display device 100 with a position detecting function according to this embodiment, the position (Y coordinate) in the Y axial direction is detected using a first light intensity distribution L2Ya for Y coordinate detection and a second light intensity distribution L2Yb for Y coordinate detection, described with reference to FIGS. 5C and 5D. More specifically, the detection light sources 12A and 12C and the detection light sources 12B and 12C are driven with reversed phases. That is, as shown in FIGS. 5C and 5D, and FIG. 6A, in a first period for Y coordinate detection, the detection light sources 12A and 12C are turned on and the detection light sources 12B and 12D are turned off, to thereby form the first light intensity distribution L2Ya for Y coordinate detection shown in FIGS. 5C and 6A. Then, in a second period for Y coordinate detection, the detection light sources 12A and 12C are turned off and the detection light sources 12B and 12D are turned on, to thereby form the second light intensity distribution L2Yb for Y coordinate detection shown in FIGS. 5D and 6A. Accordingly, using the same method as the method of detecting the X coordinate, for example, by allowing the Y coordinate detection section 52 to compare a detection value LYa in the light detector 30 in the first period for Y coordinate detection with a detection value LYb in the light detector 30 in the second period for Y coordinate detection, it is possible to detect the Y coordinate of the target object Ob.

Further, in this embodiment, when the Y coordinate is detected, in a similar way to the X coordinate detection, the difference between the detection intensity in the first light detector 31 and the detection intensity in the second light detector 32 is used as the detection values LYa and LYb.

Basic Principle of Z Coordinate Detection

When the Z coordinate is detected in the optical position detecting device 10 according to this embodiment, all the detection light sources 12A to 12D are turned on, and a light intensity distribution for Z coordinate detection in which the intensity is monotonically changed in the Z axial direction is formed. Accordingly, if the target object Ob is disposed in the detection space 10R, the detection light L2 is reflected by the target object Ob, and part of the reflected light is detected by the light detector 30. Here, since the light intensity distribution for Z coordinate detection is a constant distribution, it is possible to detect the Z coordinate of the target object Ob on the basis of the detection intensity in the light detector 30.

Further, in this embodiment, when the Z coordinate is detected, in a similar way to the X and Y coordinate detections, the difference between the detection intensity in the first light detector 31 and the detection intensity in the second light detector 32 is used.

Application of First Light Detector 31 and Second Light Detector 32

FIGS. 7A to 7D are diagrams illustrating effects of the first light detector 31 and the second light detector 32 which are installed in the optical position detecting device 10 according to the first embodiment of the invention. In FIGS. 7A to 7D, in the detection light L3 reflected by the target object Ob, light received by the first light detector 31 is indicated by the solid line, and light received by the second light detector 32 is indicated by the dashed line.

In the optical position detecting device 10 according to this embodiment, as described with reference to FIGS. 6A and 6B, or the like, the X coordinate of the target object Ob is detected, on the basis of the detection value LXa in the light detector 30 when the first light intensity distribution L2Xa for X coordinate detection is formed in the first period for X coordinate detection and the detection value LXb in the light detector 30 when the second light intensity distribution L2Xb for X coordinate detection is formed in the second period for X coordinate detection. Here, the optical position detecting device 10 is provided with the first light detector 31 and the second light detector 32 which have sensitivity peaks in different wavelength bands, as the light detector 30. In this embodiment, the difference between the detection intensity in the first light detector 31 and the detection intensity in the second light detector 32 is used as the detection values LXa and LXb. Further, the Y coordinate of the target object Ob is detected, on the basis of the detection value LYa in the light detector 30 when the first light intensity distribution L2Ya for Y coordinate detection is formed in the first period for Y coordinate detection and the detection value LYb in the light detector 30 when the second light intensity distribution L2Yb for Y coordinate detection is formed in the second period for Y coordinate detection. At this time, in this embodiment, the difference between the detection intensity in the first light detector 31 and the detection intensity in the second light detector 32 is used as the detection values LYa and LYb. Thus, for a finger which is the target object Ob, even though there are portions having different reflection ratios in the target object Ob due to nail polish coated on the nail, it is possible to detect the position of the target object Ob with high accuracy, as described below with reference to FIGS. 7A to 7D.

Figure 7A:
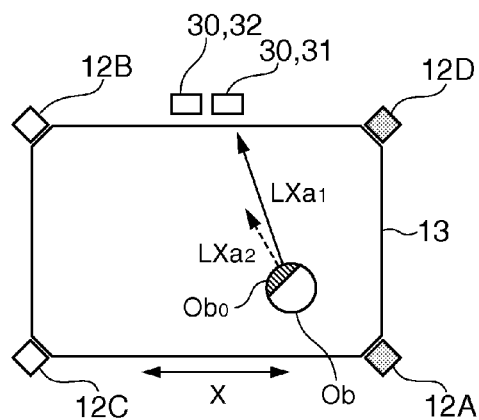
FIGS. 7A to 7D are diagrams illustrating effects of a first light detector and a second light detector which are installed in the optical position detecting device according to the first embodiment of the invention.

As shown in FIGS. 7A to 7D, if there exists a high reflection rate portion $Ob_0$ (portion on which nail polish is coated) in the object target Ob (finger), when the first light intensity distribution L2Xa for X coordinate detection is formed in the first period for X coordinate detection shown in FIG. 7A, a detection intensity $LXa_1$ in the first light detector 31 having the sensitivity peak at 1000 nm is a value obtained by adding the amount of increase in the reflection light amount in the high reflection rate portion $Ob_0$ to the detection intensity of the reflected light (detection light L3) from the target object Ob in a case where the high reflection rate portion $Ob_0$ does not exist. On the other hand, a detection intensity $LXa_2$ in the second light detector 32 having the sensitivity peak at 500 nm corresponds to the amount of light reflected in the high reflection rate portion $Ob_0$. Accordingly, a value obtained by subtracting the detection intensity $LXa_2$ in the second light detector 32 from the detection intensity $LXa_1$ in the first light detector 31 corresponds to the detection intensity in the first light detector 31 in a case where the high reflection rate portion $Ob_0$ does not exist in the object target Ob.

Figure 7B:
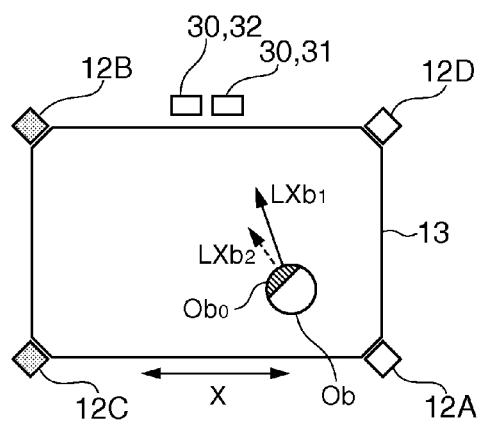

Further, in a case where the second light intensity distribution L2Xb for X coordinate detection is formed in the second period for X coordinate detection shown in FIG. 7B, a value obtained by subtracting a detection intensity $LXb_2$ in the second light detector 32 from a detection intensity $LXb_1$ in the first light detector 31 corresponds to the detection intensity in the first light detector 31 in a case where the high reflection rate portion $Ob_0$ does not exist in the object target Ob.

Accordingly, the detection values LXa and LXb described with reference to FIGS. 6A and 6B are represented as follows, $Lxa=LXa_1-Lxa_2$, $Lxb=LXb_1-Lxb_2$. It is assumed that the difference between the detection intensity $LXa_1$ in the first light detector 31 and the detection intensity $LXa_2$ in the second light detector 32, in the first period for X coordinate detection, is the detection value LXa, and the difference between the detection intensity $LXb_1$ in the first light detector 31 and the detection intensity $LXb_2$ in the second light detector 32, in the second period for X coordinate detection, is the detection value LXb. Further, the method described with reference to FIGS. 6A and 6B is performed using the detection values LXa and LXb. More specifically, the position of the target object Ob is detected on the basis of the difference or ratio between the detection values LXa and LXb including the difference between the detection intensity $LXa_1$ in the first light detector 31 and the detection intensity $LXa_2$ in the second light detector 32. Alternatively, so that the detection values LXa and LXb including the difference between the detection intensity $LXa_1$ in the first light detector 31 and the detection intensity $LXa_2$ in the second light detector 32 become equal to each other, the position of the target object Ob is detected on the basis of the difference or ratio between the control amounts after the control amounts (electric currents) for the detection light sources 12 are adjusted, or on the basis of the difference or ratio between adjustment amounts ΔLXa and ΔLXb. According to such a configuration, it is possible to enhance the linear relationship between the detection values LXa and LXb and the position of the target object Ob. Thus, it is possible to detect the X coordinate of the target object Ob with high accuracy.

Figure 7C:
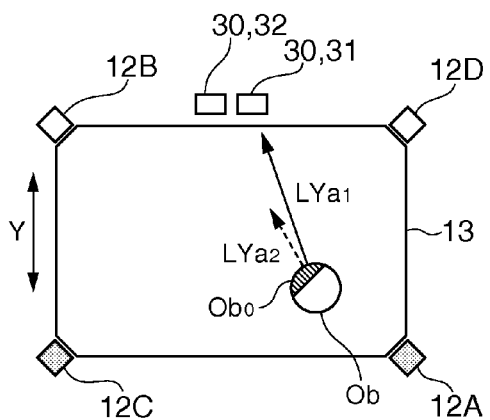
Figure 7D:
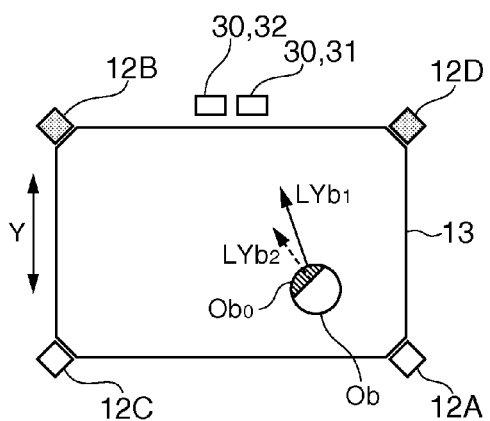

Further, when the Y coordinate is detected, it is assumed that the difference between a detection intensity $LYa_1$ in the first light detector 31 and a detection intensity $LYa_2$ in the second light detector 32, in the first period for Y coordinate detection, is the detection value LYa as shown in FIG. 7C, and the difference between a detection intensity $LYb_1$ in the first light detector 31 and a detection intensity $LYb_2$ in the second light detector 32, in the second period for Y coordinate detection, is the detection value LYb. Further, in a similar way to the case where the X coordinate is detected, if the method described with reference to FIGS. 6A and 6B is performed on the basis of the values LYa and LYb including the difference between the detection intensity $LYa_1$ in the first light detector 31 and the detection intensity $LYa_2$ in the second light detector 32, it is possible to detect the Y coordinate of the target object Ob with high accuracy.

Similarly, if the Z coordinate is detected, using as the detection value, the difference between the detection intensity in the first light detector 31 and the detection intensity in the second light detector 32, in the Z coordinate detection period, it is possible to detect the Z coordinate of the target object Ob with high accuracy.

Main Effects of this Embodiment

As described above, in the optical position detecting device 10 according to this embodiment, the plurality of detection light sources 12 is sequentially turned on to emit the detection light L2, part of the detection light L3 reflected by the target object Ob which is disposed in the detection space 10R (detection light exiting space) is received by the light detectors 30 (first light detector 31 and second light detector 32), and the position of the target object Ob is detected on the basis of the detection intensities (detection intensity in the first light detector 31 and detection intensity in the second light detector 32) in the light detectors 30. Thus, the target object Ob may be a finger or the like, and need not be a light emitting indicating device.

In such an optical position detecting device 10, in a case where the target object Ob is a finger with nail polish, for example, the reflection intensity becomes high in the coated portion compared with other portions, and thus, a position other than the position of the target object Ob influences the detection intensity in the light detector 30. Further, in this embodiment, the first light detector 31 and the second light detector 32 which have sensitivity peaks in different wavelength bands are used as the light detector 30. Thus, if the sensitivity peak in the second light detector 32 is in a band corresponding to the wavelength band reflected by the nail polish, by calculating the difference between the detection intensity of the detection light in the first light detector 31 and the detection intensity of the detection light in the second light detector 32, it is possible to compensate for the amount of the light intensity reflected by the nail polish from the detection intensity in the light detector 30. Thus, it is possible to detect the X coordinate, Y coordinate and Z coordinate of the target object Ob with high accuracy.

Further, in this embodiment, since the light guiding plate 13 which includes the plurality of light incident sections 13e to 13h and the light exiting surface 13s is provided, it is possible to form the first light intensity distribution L2Xa for X coordinate detection and the second light intensity distribution L2Xb for X coordinate detection, and also to form the first light intensity distribution L2Ya for Y coordinate detection and the second light intensity distribution L2Yb for Y coordinate detection. Thus, since it is possible to detect the X coordinate and Y coordinate of the target object Ob using the light intensity distributions in which the intensities are changed under a predetermined condition in opposite directions, it is possible to detect the X coordinate and Y coordinate of the target object Ob without the influence of environmental light or the like, compared with a case where the position of the target object Ob is detected only from one light intensity distribution. Further, since it is possible to form the light intensity distribution for Z coordinate detection by turning on all of the plurality of detection light sources 12, the Z coordinate of the target object Ob can be detected.

Furthermore, since the detection light L2 is infrared light, this is not visible. Thus, when a display device with a position detecting function which will be described later, or the like, is configured, it is advantageous that a visual contact of information is not prevented by the detection light L2.

Second Embodiment

Figure 8A:
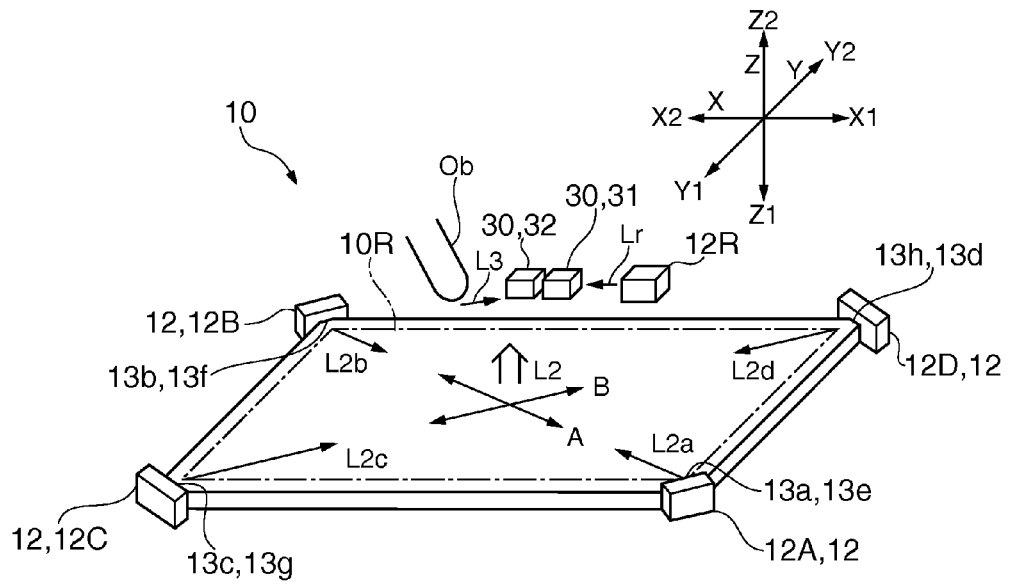
FIGS. 8A and 8B are diagrams illustrating main parts of an optical position detecting device according to a second embodiment of the invention.
Figure 8B:
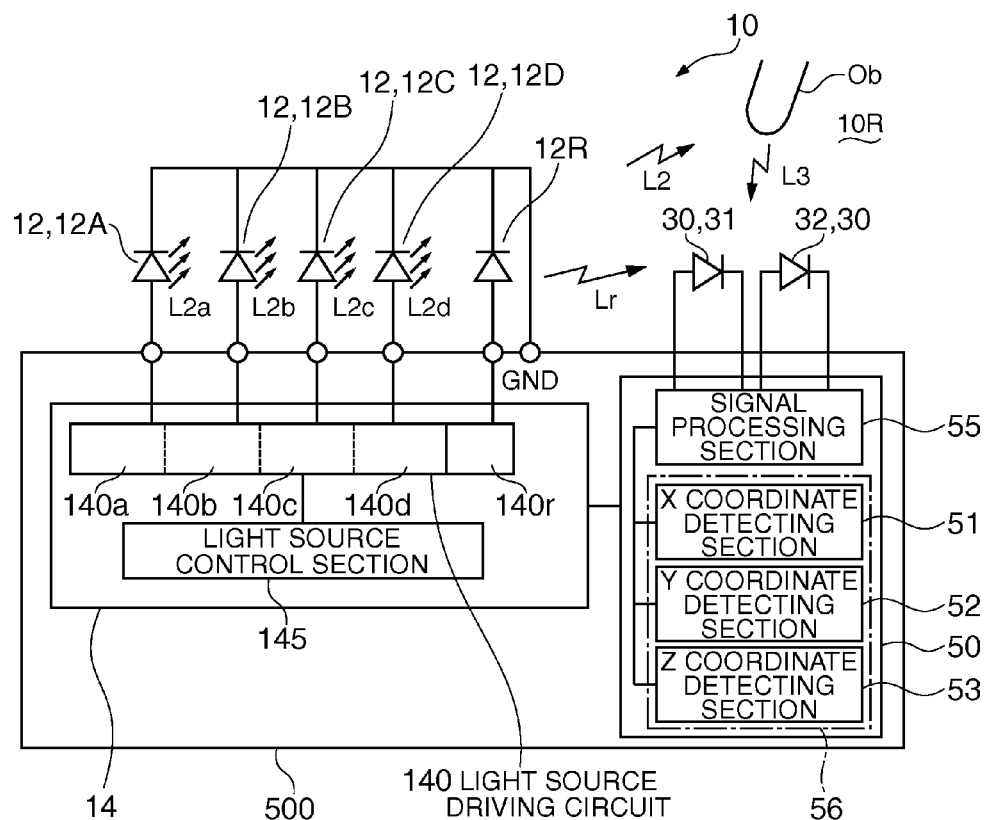

FIGS. 8A and 8B are diagrams illustrating main parts of the optical position detecting device 10 according to a second embodiment of the invention, in which FIG. 8A is a diagram illustrating a layout of optical components using the optical position detecting device 10, and FIG. 8B is a diagram illustrating an electric configuration of the optical position detecting device 10. Since the basic configuration of this embodiment is the same as that of the first embodiment, the same reference numerals are given to the same parts, and thus, description thereof will be omitted.

As shown in FIGS. 8A and 8B, the optical position detecting device 10 according to this embodiment includes a plurality of detection light sources 12 (detection light sources 12A to 12D) which emits a detection light L2, and light detectors 30 which detect part of a detection light L3 which is reflected from a target object Ob in a detection space 10R (exiting space of the detection light L2), in the detection light L2 emitted from the detection light sources 12, in a similar way to the first embodiment. Further, the optical position detecting device 10 according to this embodiment includes a light guiding plate 13 such as a transparent resin plate made of polycarbonate, acrylic resin or the like. The detection light L2 emitted from the detection light source 12 exits into the detection space 10R through the light guiding plate 13. Further, in a similar way to the first embodiment, in the optical position detecting device 10 according to this embodiment, a first light detector 31 and a second light detector 32 which have sensitivity peaks in different wavelength bands are used as the light detectors 30. The first light detector 31 has a sensitivity peak in a position which approximately overlaps with a central peak of the detection light L2, or in a wavelength band close to the central peak of the detection light L2, for example, in a wavelength band of 800 nm to 1000 nm. In this embodiment, the sensitivity peak of the light detector 31 is 1000 nm. On the other hand, the second light detector 32 has a sensitivity peak which is in the visible band and is a sensitivity peak of 500 nm, for example.

Further, the optical position detecting device 10 according to this embodiment includes a reference light source 12R which makes a reference light Lr incident to the light detector 30 (first light detector 31 and second light detector 32) without passing through the detection space 10R. The reference light source 12R is driven by a light source driving circuit 140r. The reference light Lr is a light having a peak around infrared rays close to the visible light region, in a similar way to the detection light L2, for example, at a wavelength of 850 nm.

In the optical position detecting device 10 with such a configuration, when an initial condition of the detection light sources 12A to 12D or the light detectors 30 is set, the detection intensity in the light detector 30 of the reference light Lr emitted from the reference light source 12R may be used as a reference.

Further, when the X coordinate, Y coordinate, and Z coordinate of the target object Ob are detected using the principle described with reference to FIGS. 6A and 6B, a combination of the reference light source 12R and a part of the plurality of detection light sources 12 is changed to be alternately turned on by the light source driving section 14, and thus, a result obtained by comparing detection intensities of the reference light Lr in the first light detector 31 and the second light detector 32 with the detection intensity of the detection light L3 reflected by the target object Ob can be utilized. For example, it is possible to detect the position of the target object Ob, using the difference or ratio between driving electric currents for the detection light sources 12 at the time when the reference light source 12R is differentiated from the part of the detection light sources 12 so that the detection intensities in the light detectors 30 are equal to each other, and driving electric currents for the detection light sources 12 at the time when the reference light source 12R is differentiated from the other part of the detection light sources 12 so that the detection intensities in the light detectors 30 are equal to each other. At this time, if the difference between the detection intensity of the detection light in the first light detector 31 and the detection intensity of the detection light in the second light detector 32 is used as the detection intensity in the light detectors 30 when the detection light sources 12 are turned on, even though nail polish exists on the finger as the target object Ob, it is possible to detect the position of the target object Ob with high accuracy.

Other Embodiments

In the above-described embodiment, the invention is applied to the optical position detecting device 10 in which the light intensity distribution is formed using the light guiding plate 13. However, the invention may be applied to the optical position detecting device 10 without using the light guiding plate 13.

Further, in the above-described embodiment, the invention is applied to the optical detecting device 10 which includes four detection light sources 12. However, the invention may be applied to the optical position detecting device 10 which includes three, or five or more, detection light sources 12.

First Specific Example of Display Device with Position Detecting Function

Figure 9:
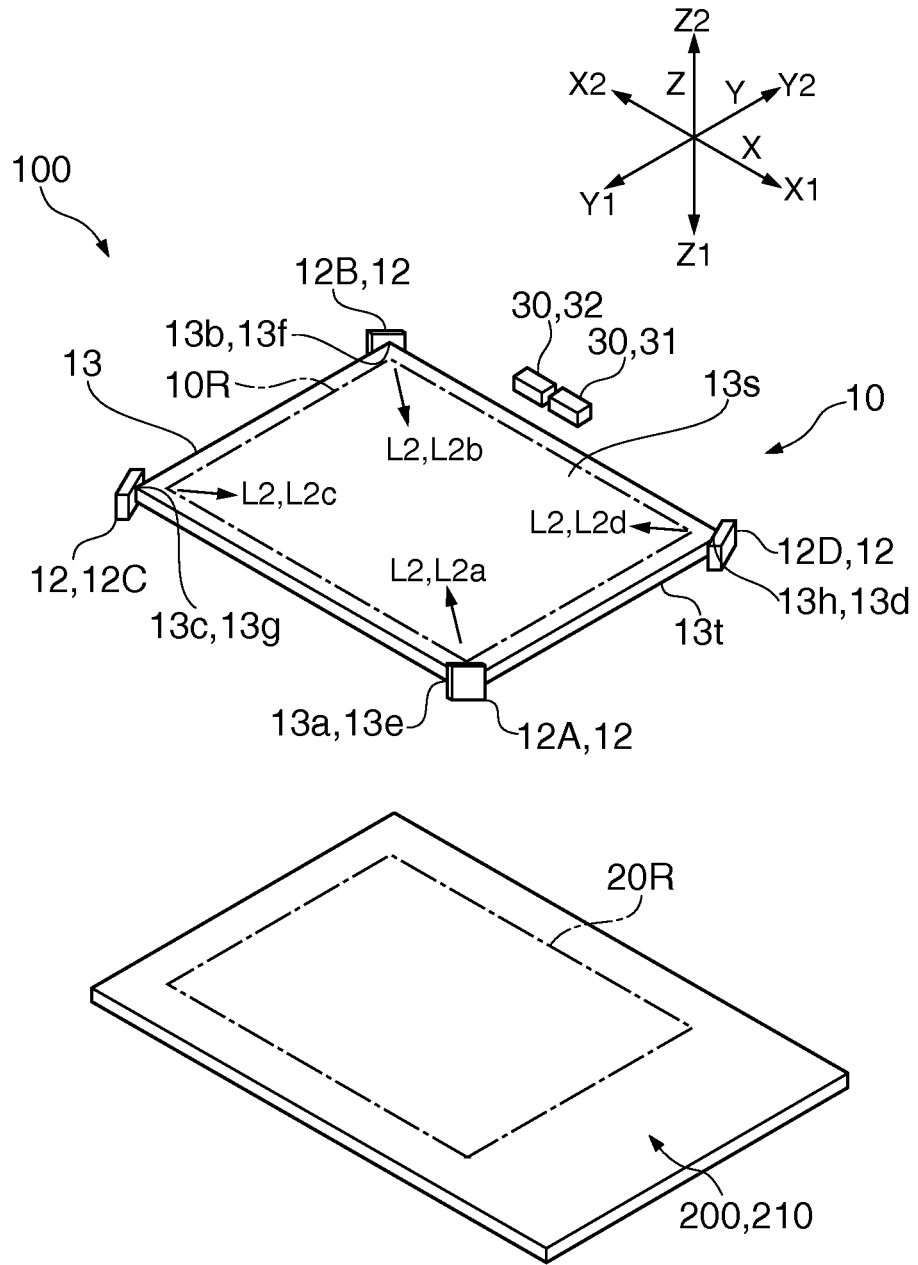
FIG. 9 is an exploded perspective view of a display device with a position detecting function which includes the optical position detecting device to which the invention is applied, which illustrates a cross-sectional configuration thereof.
Figure 10:
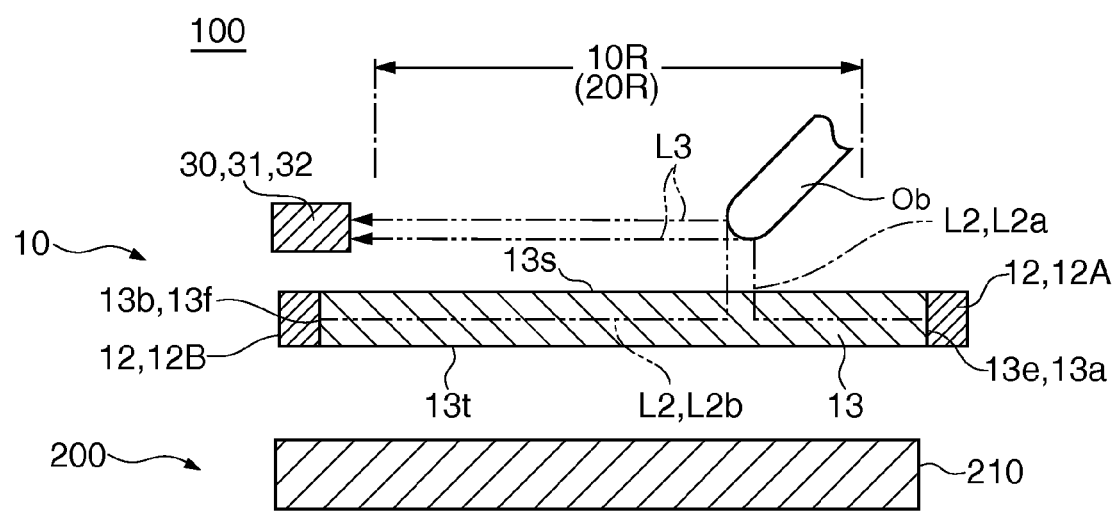
FIG. 10 is a diagram illustrating a cross-sectional configuration of a display device with a position detecting function which includes the optical position detecting device to which the invention is applied.

FIG. 9 is an exploded perspective view of a display device with a position detecting function which includes the optical position detecting device 10 to which the invention is applied, and FIG. 10 is a diagram illustrating a cross-sectional configuration thereof. In the display device 100 with the position detecting function, since the configuration of the optical position detecting device 10 is the same as in the above-described embodiment, the same reference numerals are given to the same parts, and thus, description thereof will be omitted.

The display device 100 with the position detecting function shown in FIGS. 9 and 10 includes the optical position detecting device 10 and an image generating device 200. The optical position detecting device 10 includes detection light sources 12 which emit detection lights, a light guiding plate 13, and light detectors 30 (first light detector 31 and second light detector 32) which have a receiving section facing the detection space 10R. The image generating device 200 is a direct-view display device 210 such as an organic electroluminescence device or a plasma display device, and is disposed on a side opposite to an input operation side in the optical position detecting device 10. The direct-view display device 210 includes an image display region 20R in a region which overlaps with the light guiding plate 13 when seen from a planar view, and the image display device 20R overlaps with the detection space 10R when seen from a planar view.

According to such a configuration, when the image formed by the image generating device 200 is indicated by a finger (target object Ob) or the like, since the indication position can be detected by the optical position detecting device 10, it is possible to utilize the position of the finger as input information.

Second Specific Example of Display Device with Position Detecting Function

Figure 11:
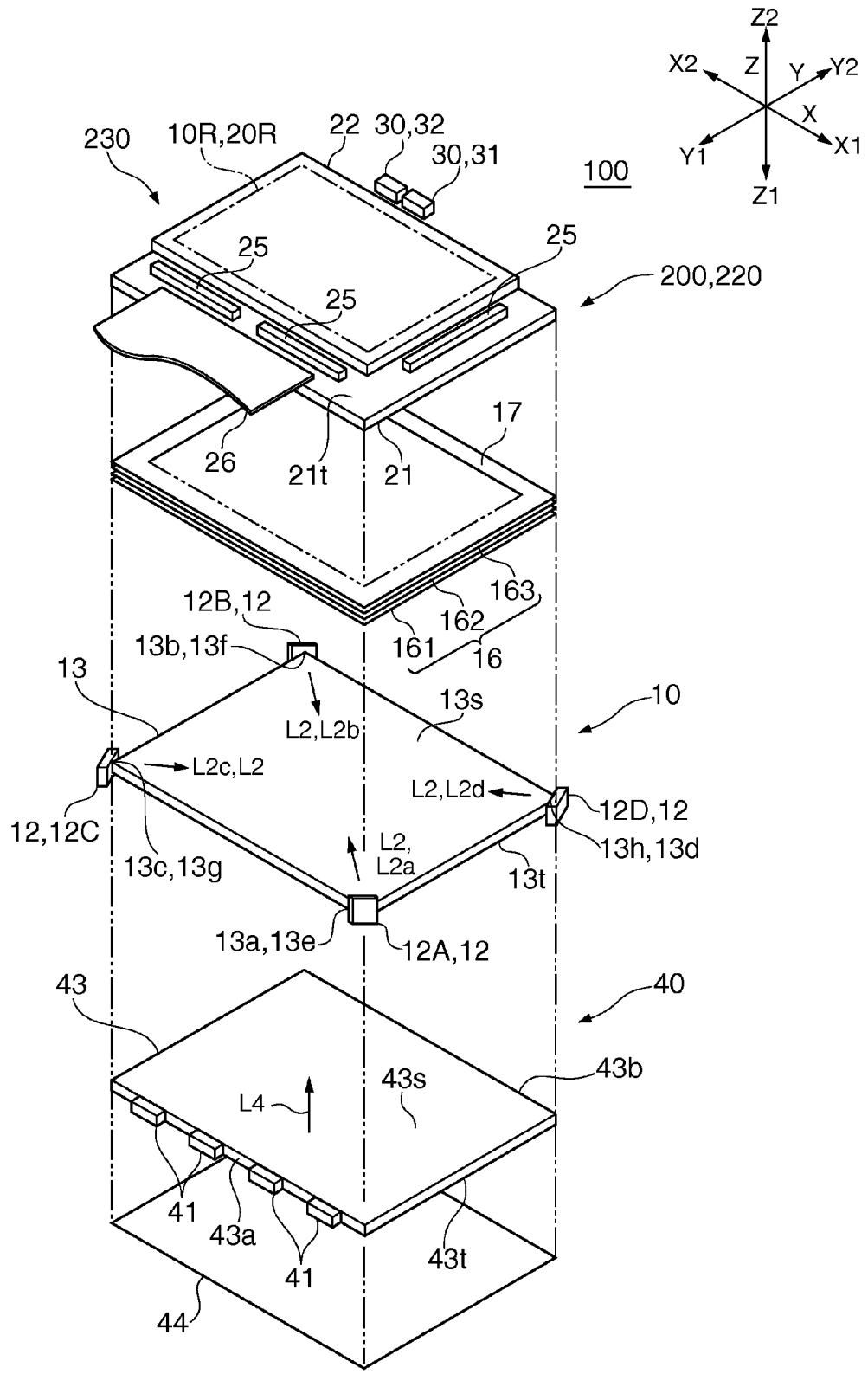
FIG. 11 is an exploded perspective view of another display device with a position detecting function to which the invention is applied.
Figure 12:
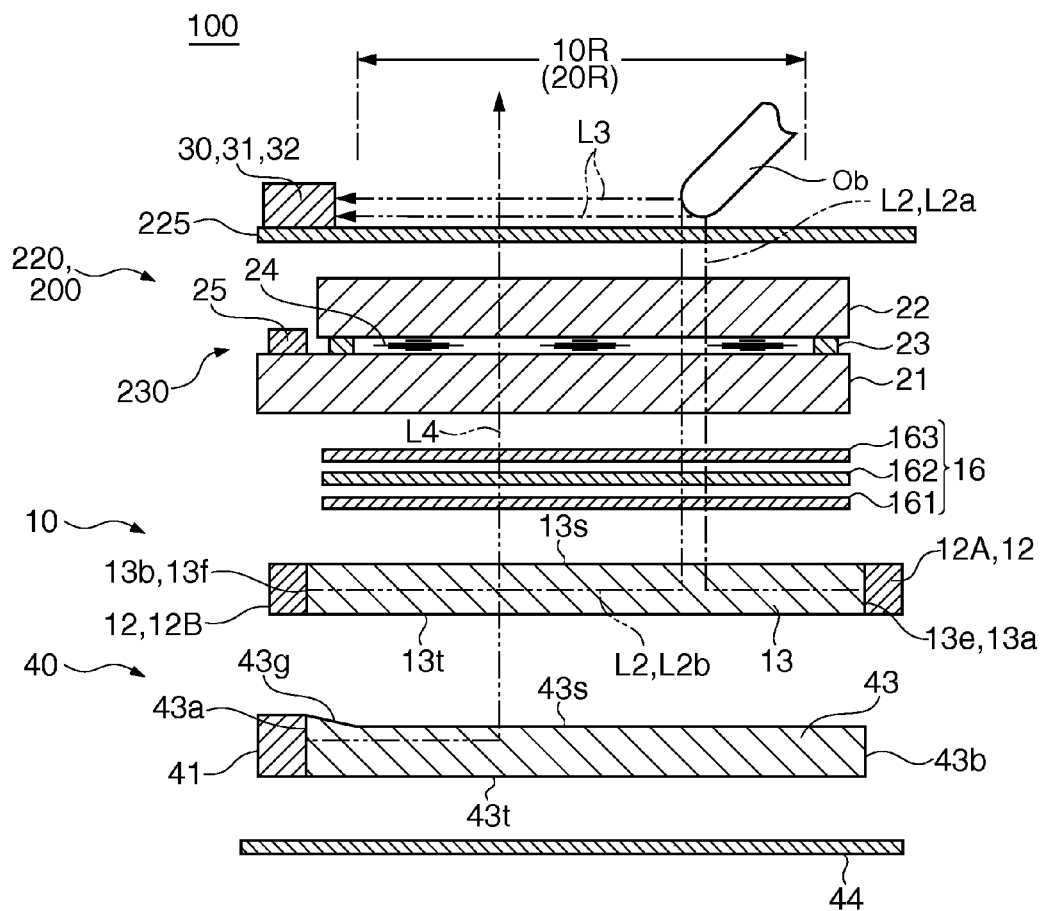
FIG. 12 is a diagram illustrating a cross-sectional configuration of still another display device with a position detecting function to which the invention is applied.

FIG. 11 is an exploded perspective view of another display device 100 with a position detecting function to which the invention is applied, and FIG. 12 is a diagram illustrating a cross-sectional configuration thereof. In the display device 100 with the position detecting function, since the configuration of the optical position detecting device 10 is the same as in the above-described embodiment, the same reference numerals are given to the same parts, and thus, description thereof will be omitted.

The display device 100 with the position detecting function shown in FIGS. 11 and 12 includes the optical position detecting device 10 and the image generating device 200. The optical position detecting device 10 includes detection light sources 12 which emit detection lights, the light guiding plate 13, and the light detectors 30 (first light detector 31 and second light detector 32) which have a receiving section facing the detection space 10R. The image generating device 200 includes a liquid crystal device 220 which is a direct-view display device, and a translucent cover 225. The liquid crystal device 220 includes the image display region 20R in the region which overlaps with the light guiding plate 13 when seen from a planar view, and the image display device 20R overlaps with the detection space 10R when seen from a planar view.

In the display device 100 with the position detecting function according to this embodiment, an optical sheet 16 for obtaining uniformity in detection lights L2a to L2d is disposed on the light exiting side of the light guiding plate 13, as necessary. In this embodiment, as the optical sheet 16, a first prism sheet 161 which faces a light exiting surface 13s of the light guiding plate 13, a second prism sheet 162 which faces the first prism sheet 161 on a side opposite to the side where the light guiding plate 13 is disposed, and a light scattering plate 163 which faces the second prism sheet 162 on a side opposite to the side where the light guiding plate 13 is disposed are used. On a side opposite to the side where the light guiding plate 13 is disposed with reference to the optical sheet 16, a light-blocking sheet of a rectangular frame shape is disposed around the optical sheet 16. Such a light-blocking sheet 17 prevents the detection lights L2a to L2d emitted from the detection light sources 12A to 12D from leaking.

The liquid crystal device 200 (image generating device 200) includes a liquid crystal display panel 230 which is on the optical sheet 16 (first prism sheet 161, second prism sheet 162 and light scattering plate 163) on a side opposite to the side where the light guiding plate 13 is disposed. In this embodiment, the liquid crystal display panel 230 is a transmissive liquid crystal display panel, and has a structure in which two translucent substrates 21 and 22 are attached by a sealing member 23 and a liquid crystal 24 is filled between the substrates. In this embodiment, the liquid crystal display panel 230 is an active matrix type liquid crystal display panel.

Translucent pixel electrodes, data lines, scanning lines, pixel switching elements (not shown) are formed on one side of two translucent substrates 21 and 22, and a translucent common electrode (not shown) is formed on the other side thereof. The pixel electrodes and the common electrode may be formed on the same substrate. In such a liquid crystal display panel 230, if a scanning signal is output through the scanning line for each pixel, and an image signal is output through the data line, orientation of the liquid crystal 24 is controlled in each of the plurality of pixels, and thus, an image is formed on the image display region 20R.

In the liquid crystal display panel 230, the one translucent substrate 21 is formed with a substrate extending section 21t which is extended from the periphery of the other translucent substrate 22. Electronic components 25 which form driving circuits or the like are mounted on a surface of the substrate extending section 21t. Further, a wiring member 26 such as a flexible wiring substrate (FPC) is connected to the substrate extending section 21t. Only the wiring member 26 may be mounted on the substrate extending section 21t. A polarization plate (not shown) is disposed on outer surface sides of the translucent substrates 21 and 22, as necessary.

Here, in order to detect a planar position of the target object Ob, it is necessary to emit the detection lights L2a to L2d toward a visual contact side where operation by means of the target object Ob is performed. The liquid crystal display panel 230 is disposed to the visual contact side (operation side) with reference to the light guiding plate 13 and the optical sheet 16. Accordingly, in the liquid crystal display panel 230, the image display region 20R is configured to transmit the detection lights L2a to L2d. In a case where the liquid crystal display panel 230 is disposed on a side opposite to the visual contact side of the light guiding plate 13, it is not necessary that the image display region 20R transmits the detection lights L2a to L2d, but instead, it is necessary that the image display region 20R can be seen through from the visual contact side through the light guiding plate 13.

The liquid crystal device 220 includes an illuminating device 40 which illuminates the liquid crystal display panel 230. In this embodiment, the illuminating device 40 is disposed between the light guiding plate 13 and a reflection plate 44 on a side opposite to the side where the liquid crystal display panel 230 is disposed with reference to the light guiding plate 13. The illuminating device 40 includes an illumination light source 41 and an illumination light guiding plate 43 which allows an illumination light emitted from the illumination light source 41 to propagate therein and to exit therefrom. The illumination light guiding plate 43 has a rectangular planar shape. The illumination light source 41 is configured by a detection light source such as an LED (light emitting diode), and emits a white illumination light L4, for example, according to a driving signal output from the driving circuit (not shown). In this embodiment, the plurality of the illumination light sources 41 is disposed along a side portion 43a of the illumination light guiding plate 43.

The illumination light guiding plate 43 includes an inclined surface 43g disposed on a surface portion (circumferential portion of the side portion 43a of the light exiting surface 43s) on a light exiting side adjacent to the side portion 43a. The illumination light guiding plate 43 has a thickness which is gradually increased toward the side portion 43a. Through a light entrance structure having such an inclined surface 43g, the height of the side portion 43a matches with the height of the light emitting surface of the illumination light source 41, while suppressing an increase in the thickness of the portion where the light emitting surface 43s is provided.

In such an illuminating device 40, the illumination light emitted from the illumination light source 41 is incident inside the illumination light guiding plate 43 from the side portion 43a of the illumination light guiding plate 43, passes through the inside of the illumination light guiding plate 43 toward an opposite outer edge 43b, and then exits from the light exiting surface 43s which is one surface. Here, the illumination light guiding plate 43 has a light guide structure in which the ratio of the amount of the light exiting from the light exiting surface 43s to the light propagating thereinside from the side portion 43a toward the opposite outer edge 43b monotonically increases. Such a light guide structure is realized, for example, by gradually increasing, along the inside direction, the area of a refraction surface having a minute concave-convex shape for light deflection or light scattering formed on the light exiting surface 43s of the illumination light guide plate 43 or a rear surface 43t thereof, the formation density of a printed scattering layer, or the like. With such a light guide plate, the illumination light L4 incident from the side portion 43a exits from the light exiting surface 43s at an approximately uniform level.

In this embodiment, the illumination light guiding plate 43 is disposed to overlap in a planar manner with the image display region 20R of the liquid crystal display panel 230 on a side opposite to the visual contact side of the liquid crystal display panel 230, to thereby function as a so-called back light. Here, the illumination light guiding plate 43 may be disposed on the visual contact side of the liquid crystal display panel 230, to thereby function as a so-called front light. Further, in this embodiment, the illumination light guiding plate 43 is disposed between the light guiding plate 13 and the reflection plate 44, but the illumination light guiding plate 43 may be disposed between the optical sheet 16 and the light guiding plate 13. Furthermore, the illumination light guiding plate 43 and the light guiding plate 13 may be configured as a common light guiding plate. In addition, in this embodiment, the optical sheet 16 is commonly used between the detection lights L2a to L2d and the illumination light L4. However, an exclusive optical sheet different from the optical sheet 16 may be disposed on the light emitting side of the illumination light guiding plate 43. The reason is as follows. In order to uniformize the average luminance of the illumination light L4 exiting from the light emitting surface 43s in the illumination light guiding plate 43, the light scattering plate for providing a sufficient light scattering effect is frequently used. However, if the detection lights L2a to L2d exiting from the light exiting surface 13s are significantly scattered in the light guiding plate 13 for position detection, this causes interference of the position detection. Thus, since the light scattering plate is not provided, or it is necessary to use the light scattering plate which provides a relatively low light scattering effect, it is desirable that the light scattering plate is exclusively used for the illumination light guiding plate 43. Here, the optical sheet having a light focusing effect such as a prism sheet (first prism sheet 161 or second prism sheet 162) may be commonly used.

With such a configuration, when the image formed by the image generating device 200 (liquid crystal device 220) is indicated by a finger (target object Ob) or the like, since the indication position can be detected by the optical position detecting device 10, it is possible to use the position of the finger as input information.

Third Specific Example of Display Device with Position Detecting Function

Figure 13A:
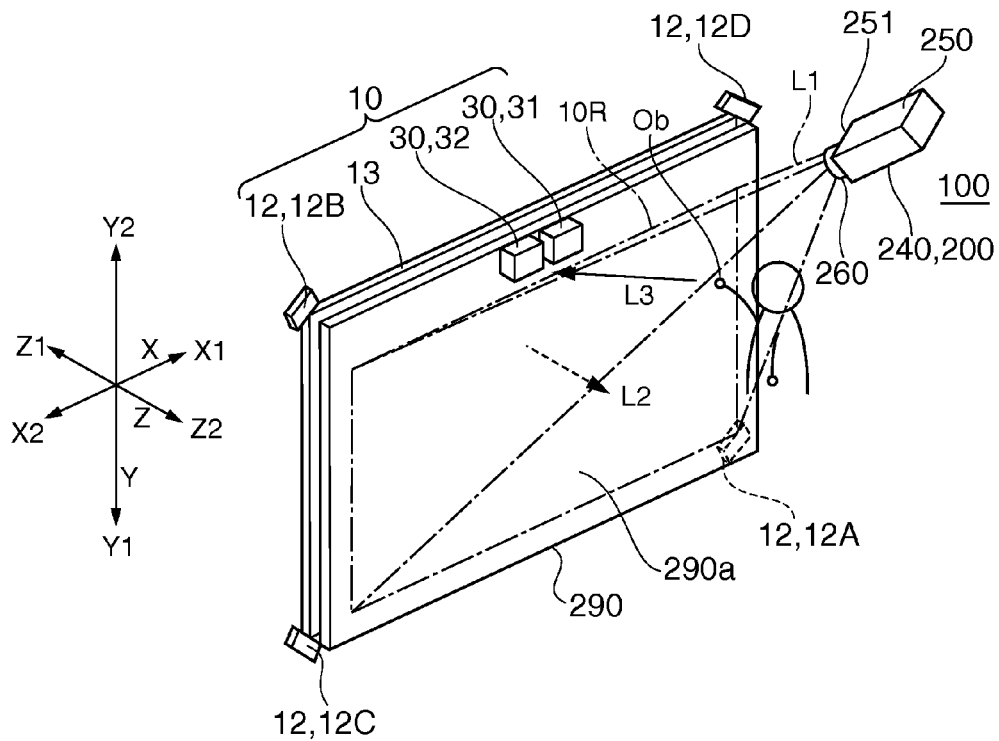
FIGS. 13A and 13B are diagrams illustrating a configuration of yet still another display device with a position detecting function of the invention.
Figure 13B:
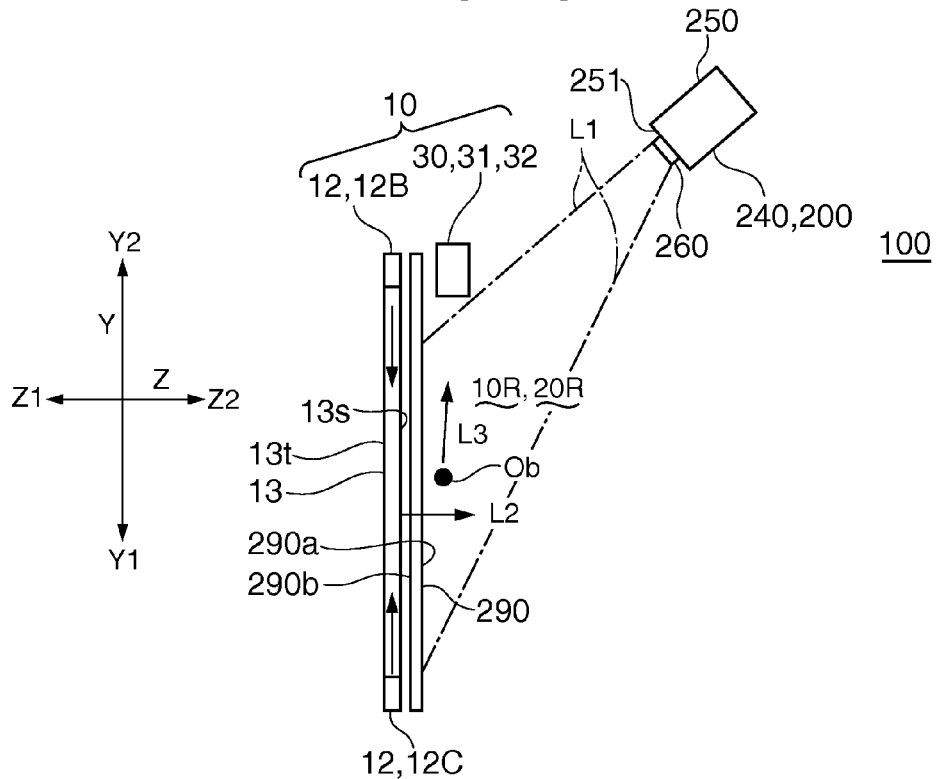
Figure 14:
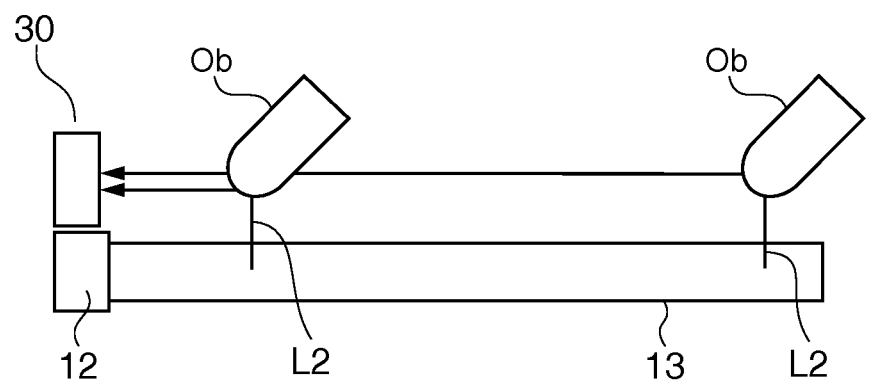
FIG. 14 is a diagram illustrating an optical position detecting device according to a reference example of the invention.

FIGS. 13A and 13B are diagrams schematically illustrating a configuration of another display device 100 with a position detecting function of the invention, in which FIG. 13A is a diagram schematically illustrating a state where main parts of the display device 100 with the position detecting function are obliquely seen from the top, and FIG. 13B is a diagram schematically illustrating a state seen from the transverse direction. In the display device 100 with the position detecting function according to this embodiment, since a configuration of the optical position detecting device 10 is the same as that of the above-described embodiment, the same reference numerals are given to the same parts, and thus, description thereof will be omitted.

The optical position detecting device 10 shown in FIGS. 13A and 13B is used in the display device 100 with a transmissive position detecting function. The display device 100 with the position detecting function includes an image projection device 240 (image generating device 200) called a liquid crystal projector, or a digital-micro-mirror device, and a screen member 290. The image projection device 240 enlarges and projects an image display light L1 toward the screen member 290 from a projection lens system 260 installed in a front surface section 251 of a housing 250.

The display device 100 with the position detecting function according to this embodiment is provided with the optical position detecting device 10. The optical position detecting device 10 has the function of optically detecting the position of the target object Ob in the detection space 10R set on the side of a screen surface 290a (front side of the screen member 290) in which an image is visualized in the screen member 290. In this embodiment, the detection space 10R is a rectangular region when seen along a normal line with respect to the screen member 290, which overlaps with a region (image display region 20R) to which the image is projected by the image projection device 240 in the screen member 290.

The optical position detecting device 10 in this embodiment detects the position of the target object Ob in the XY plane (detection surface) parallel to the screen member 290 in the detection space 10R. Accordingly, in the display device 100 with the position detecting function according to this embodiment, for example, a result obtained by detecting the XY coordinates of the target object Ob in the optical position detecting device 10 is considered as input information or the like in which a part of the projected image or the like is designated, and thus, it is possible to perform image switching or the like on the basis of such input information. Further, the optical position detecting device 10 in this embodiment detects the position (Z coordinate) of the target object Ob in the normal line direction (Z axial direction) with respect to the screen member 290 in the detection space 10R. Accordingly, in the display device 100 with the position detecting function according to this embodiment, for example, it is possible to consider the case where the target object Ob is only within a predetermined distance from the screen member 29 as the input information.

In such an optical position detecting device 10, the light guide plate 13 is provided on the side of a rear surface 290b of the screen member 290, and the plurality of detection light sources 12 (detection light sources 12A to 12D) is disposed around the light guiding plate 13. Further, the light detectors 30 (first light detector 31 and second light detector 32) which have a light receiving section facing the detection space 10R are disposed on the side of a screen surface 290a.

According to this configuration, the detection light L2 exits from the side of the rear surface 290b of the screen member 290 to the detection space 10R. The screen member 290 has the translucency for the detection light L2. More specifically, the screen member 290 is made of fabric in which a white dye is coated on the side of the screen surface 290a or a white screen made of an embossing-processed white vinyl material, and has the translucency for the detection light L2 of the infrared light. As the screen member 290, a sliver screen highly silvered for enhancing a reflection rate, a pearl screen having a high reflection rate obtained by performing resin processing on a fabric surface which forms the side of the screen surface 290a, or a piece screen having a high reflection rate obtained by coating a minute glass powder on the side of the screen surface 290a may be used. In this case, the screen member 290 has the translucency for the detection light L2 of the infrared light. The screen member 290 may have a black light blocking layer on the rear surface 290b in order to enhance the quality of the displayed image. In this case, the light blocking layer may have a plurality of translucent portions made of holes.

In this embodiment, the screen device for a projection display device has been described, but a screen device with a position detecting function for an electronic blackboard may be configured by installing the optical position detecting device 10 in a screen for the electronic blackboard.

The entire disclosure of Japanese Patent Application No. 2010-133677, filed Jun. 11, 2010 is expressly incorporated by reference herein.

What is claimed is:

1. An optical position detecting device comprising:
a plurality of detection light source sections which emits a detection light;
a light source driving section that turns on a part of the plurality of detection light source sections in a first period and that turns on the other part thereof in a second period;
a first light detector that has a first sensitivity peak in a first wavelength band and that detects the detection light reflected by an object so as to provide first detection light intensity;
a second light detector that has a second sensitivity peak in a second wavelength band that is different from the first wavelength band and that detects the detection light reflected by the object so as to provide second detection light intensity; and
a position detecting section that detects a position of the object based on the first detection light intensity and the second detection light intensity in the first and second periods.

2. The optical position detecting device according to claim 1,
wherein the position detecting section detects the position of the object based on a difference between the first light intensity and the second light intensity.

3. The optical position detecting device according to claim 1,
further comprising a light guiding plate which is provided with a light incident section to which the detection light emitted from the plurality of detection light source sections is incident and a light exiting section from which the detection light incident from the light incident section exits,
wherein a first light intensity distribution for a first coordinate detection in which a light intensity monotonically decreases from one side of a first direction which intersects with a light exiting direction of the detection light from the light guiding plate toward the other side thereof, and a second light intensity distribution for a first coordinate detection in which a light intensity monotonically decreases from the other side of the first direction to the one side thereof, are sequentially formed in the first period and the second period for the first coordinate detection.

4. The optical position detecting section according to claim 3, wherein a first light intensity distribution for a second coordinate detection in which a light intensity monotonically decreases from one side of a second direction which intersects with the light exiting direction of the detection light from the light guiding plate and the first direction toward the other side thereof, and a second light intensity distribution for a second coordinate detection in which a light intensity monotonically decreases from the other side of the second direction to the one side thereof, are sequentially formed in the first period and the second period for the second coordinate detection.

5. The optical position detecting device according to claim 1,
wherein the light source driving section drives the part of the plurality of detection light source sections and the other part thereof so that third and fourth detection light intensity in the first and second light detectors, respectively, when the part of the plurality of detection light source sections is turned on becomes equal to fifth and sixth detection light intensity in the first and second light detectors, respectively, when the other part thereof is turned on.

6. The optical position detecting device according to claim 1,
further comprising a reference light source section which emits a reference light incident to the first and second light detectors without being reflected by the object,
wherein the light source driving section drives the reference light source section and the part of the plurality of detection light source sections so that third and fourth detection light intensity in the first and second light detectors, respectively, when the reference light source section is turned on becomes equal to fifth and sixth detection light intensity in the first and second light detectors, respectively, when the part of the plurality of detection light source sections is turned on.

7. The optical position detecting device according to claim 1, wherein the detection light is infrared light.

8. A display device with a position detecting function which is provided with the optical position detecting device in claim 1, comprising:
an image generating device which forms an image,
wherein a detection light is emitted to be overlapped with the image.

* * * * *